(No Model.) 2 Sheets—Sheet 1.

I. PANAMÁ.
TREE PLANTER.

No. 549,682. Patented Nov. 12, 1895.

Witnesses,

Inventor,
Ignacio Panamá
By Dewey & Co.
Attys (No Model.) 2 Sheets—Sheet 2.

I. PANAMA.
TREE PLANTER.

No. 549,682. Patented Nov. 12, 1895.

Witnesses,

Inventor
Ignacio Panamá
By Dewey & Co.
Att'ys

UNITED STATES PATENT OFFICE.

IGNACIO PANAMÁ, OF SANTA ANA, SAN SALVADOR.

TREE-PLANTER.

SPECIFICATION forming part of Letters Patent No. 549,682, dated November 12, 1895.

Application filed July 5, 1895. Serial No. 555,074. (No model.)

*To all whom it may concern:*

Be it known that I, IGNACIO PANAMÁ, a citizen of the Republic of San Salvador, residing at Santa Ana, San Salvador, have invented an Improvement in Tree-Planters; and I hereby declare the following to be a full, clear, and exact description of the same.

My invention relates to that class of machines for making holes in the ground which from the use to which they are generally applied are called "tree-planters," though often used for digging post-holes and other similar work.

My invention consists in the novel connections hereinafter described for operating the auger or digging implement by power derived from a suitable portable engine mounted upon a wheeled frame.

The object of my invention is to increase the speed, power, and general efficiency of the machine.

Figure 1:
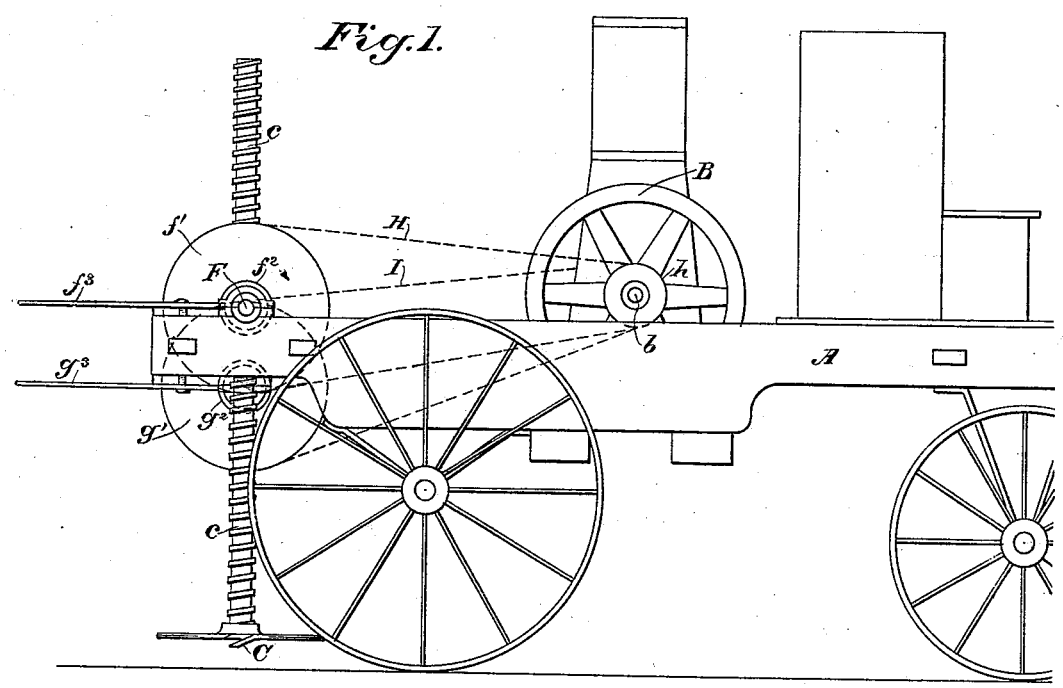
Figure 2:
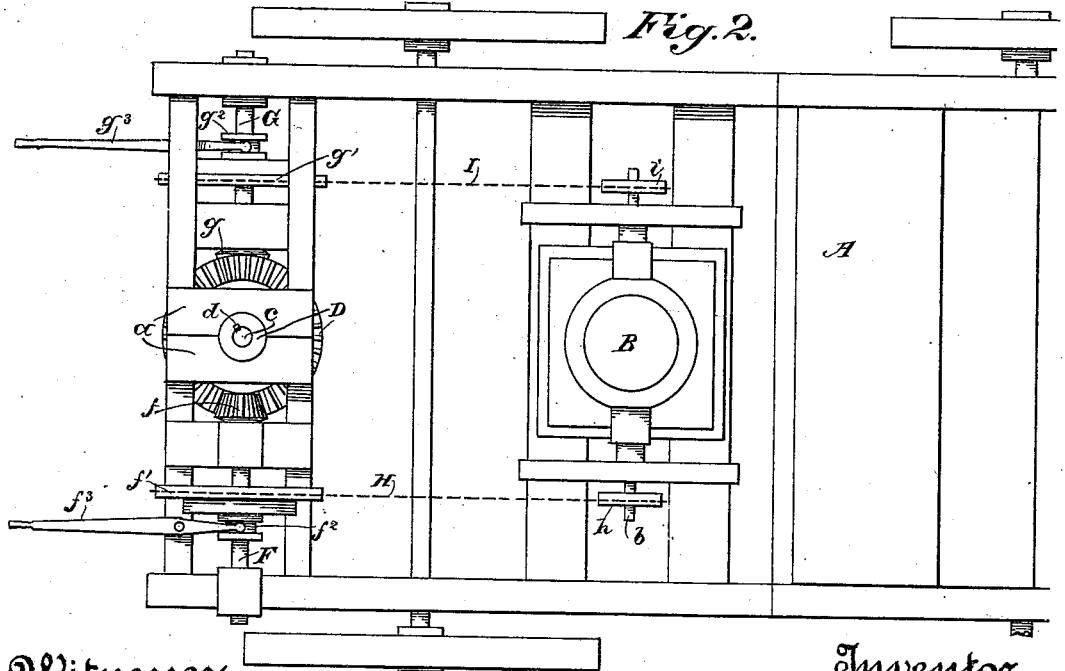
Figure 3:
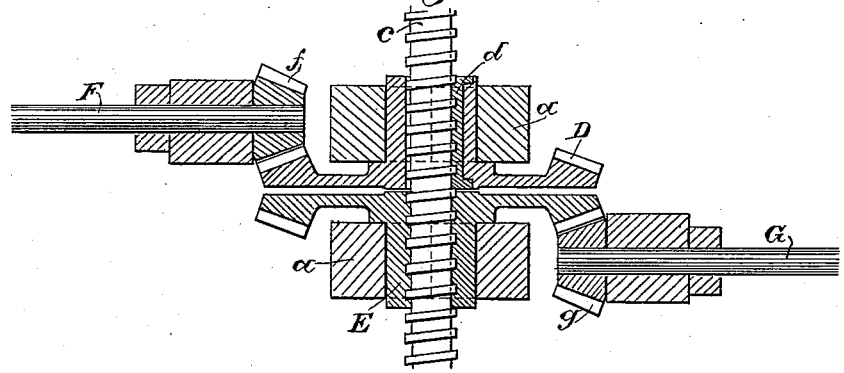
Figure 4:
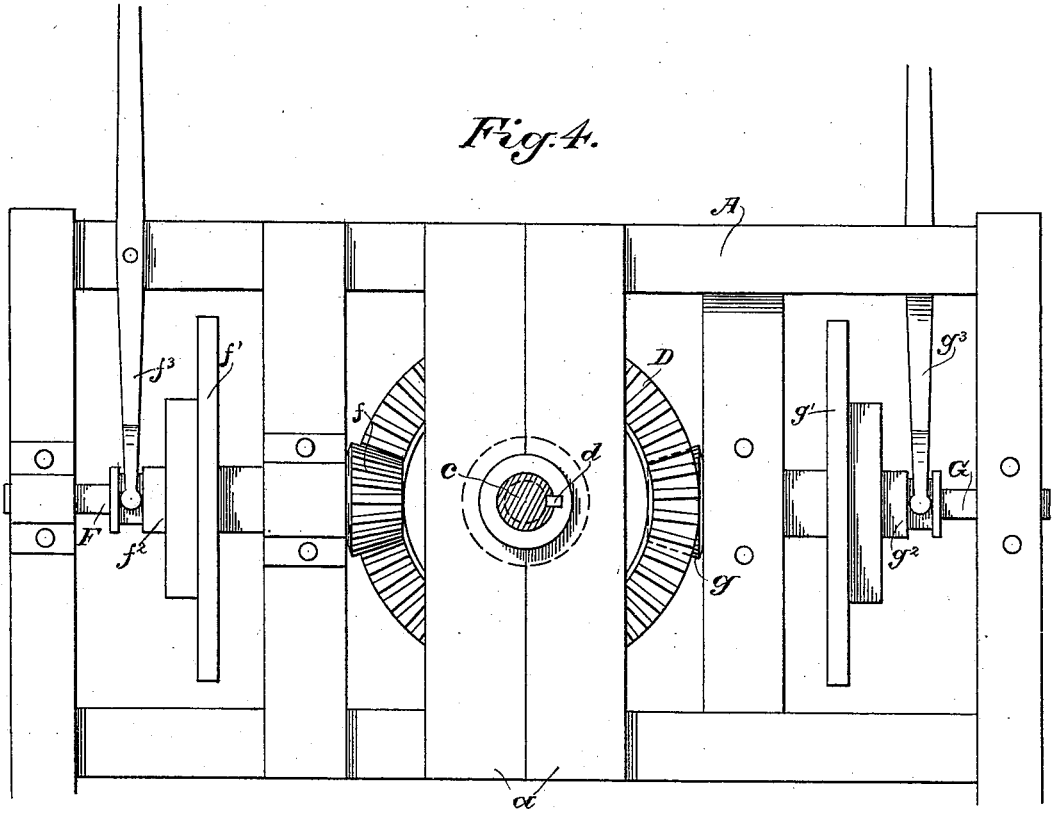

Referring to the accompanying drawings, Figure 1 is a side elevation of my machine. Fig. 2 is a plan of same. Fig. 3 is a section of the screw-driving mechanism. Fig. 4 is a plan of same.

A is a wheeled vehicle on which is mounted a suitable engine, here represented by B. This engine may be of any character—as, for example, a small gas-engine.

C is the auger or boring implement, and $c$ is its screw-stem.

D, Figs. 3 and 4, is a gear which is mounted on the stem $c$ by means of a feather or spline $d$, which is connected with the gear and is seated freely in a longitudinal keyway in the stem, whereby the latter may move up and down.

E is a gear-nut seated on the stem below the gear D. Both gear and nut are held together and prevented from moving vertically by suitable timbers $a$, Fig. 3.

F is a shaft, having a pinion $f$, which meshes with the gear D.

G is a shaft, having a pinion $g$, which meshes with the gear-nut E.

Upon shaft F is loosely mounted a chain-pulley $f'$, which is adapted to be thrown into and out of connection with said shaft by means of a friction-clutch $f^2$, operated by lever $f^3$. Shaft G is similarly provided with a loose chain-pulley $g'$, adapted to be thrown into and out of connection by means of a friction-clutch $g^2$ and lever $g^3$. Pulley $f'$ is driven by a chain H from a chain-pulley $h$ on the engine-shaft $b$. Pulley $g'$ is driven by a chain I from a chain-pulley $i$ on the engine-shaft $b$.

The operation is as follows: When pulley $f'$ is thrown into gear by its clutch, and pulley $g'$ is thrown out of action, the gear D is rotated, while the nut E remains idle. The screw-stem $c$ is thus turned and the auger is forced into the ground. To raise the auger, the pulley $f'$ is thrown out of gear and the pulley $g'$ is thrown into action, thereby turning nut E and lifting the screw-stem and auger.

Having thus described my invention, what I claim as new, and desire to secure by Letters Patent, is—

An improved earth auger consisting of a wheeled frame provided with an engine or motor, a screw-stem mounted at one end of the frame and provided with a boring tool or implement, a gear D mounted on the stem by means of a feather or spline, seated freely in a groove or key-way in the stem, a gear-nut below the gear D and stops formed by the frame above and below the gear and gear nut whereby the gear and nut are held together and prevented from moving vertically, a shaft extending transversely across one side of the front of the frame and provided with a pinion to engage said gear, a second shaft extending transversely across the opposite side of the front of the machine, and provided with a pinion to engage the gear nut, loosely-mounted chain pulleys on said shafts and clutches whereby the pinions are thrown into and out of connection with the gear and gear nut.

In witness whereof I have hereunto set my hand.

IGNACIO PANAMÁ.

Witnesses:
GEORGE V. PLENDER,
J. M. ELLIS.